United States Patent
Boury et al.

(10) Patent No.: US 7,530,788 B2
(45) Date of Patent: May 12, 2009

(54) HOLLOW TURBOMACHINE BLADE

(75) Inventors: Jacques Auguste Amedée Boury, Saint Ouen En Brie (FR); Damien Bonneau, Melun (FR); Thierry Fachat, Moissy Cramayel (FR)

(73) Assignee: SNECMA, Paris (FR)

( * ) Notice: Subject to any disclaimer, the term of this patent is extended or adjusted under 35 U.S.C. 154(b) by 472 days.

(21) Appl. No.: 11/473,020

(22) Filed: Jun. 23, 2006

(65) Prior Publication Data
US 2009/0092500 A1   Apr. 9, 2009

(30) Foreign Application Priority Data
Jun. 24, 2005   (FR)   ................................. 05 06442

(51) Int. Cl.
*F01D 5/18*   (2006.01)
(52) U.S. Cl. ...................... 416/92; 416/97 R; 416/96 R
(58) Field of Classification Search ................. 415/115, 415/116; 416/97 R, 97 A, 96 R, 92
See application file for complete search history.

(56) References Cited

U.S. PATENT DOCUMENTS

| | | | |
|---|---|---|---|
| 5,348,446 A | 9/1994 | Lee et al. | |
| 6,672,829 B1 * | 1/2004 | Cherry et al. | ............... 415/115 |
| 2004/0096328 A1 * | 5/2004 | Soechting et al. | ............. 416/92 |
| 2004/0197190 A1 | 10/2004 | Stec et al. | |

FOREIGN PATENT DOCUMENTS

| | | |
|---|---|---|
| EP | 0 816 636 A1 | 1/1998 |
| EP | 1 270 873 A2 | 1/2003 |
| EP | 1 281 837 A1 | 2/2003 |
| EP | 1 422 383 A2 | 5/2004 |

* cited by examiner

*Primary Examiner*—Edward Look
*Assistant Examiner*—Dwayne J White
(74) *Attorney, Agent, or Firm*—Oblon, Spivak, McClelland, Maier & Neustadt, P.C.

(57) ABSTRACT

A hollow turbomachine blade including an internal cooling passage, an open cavity situated at the free end of the blade and defined by an end wall and the side wall of at least one rim which extends between the leading edge and the trailing edge of the blade, and at least one cooling channel connecting said internal cooling passage to said open cavity, said cooling channel opening out at the base of the rim and the wall of the rim forming an angle relative to said end wall that is obtuse, being strictly greater than 90°. An indentation may be formed in the wall of the rim at the outlet from said cooling channel. Said blade advantageously does not include a pressure rim.

8 Claims, 2 Drawing Sheets

HOLLOW TURBOMACHINE BLADE

The invention relates to a hollow turbomachine blade, and more particularly it can relate to a hollow blade of the type for a high-pressure gas turbine rotor in a turbojet.

BACKGROUND OF THE INVENTION

As shown in FIGS. 1 and 2, it is known to provide an open cavity 5 or "bathtub" at the free end 3 of a hollow blade 2, the cavity being defined by an end wall 7 that extends over the entire end of the blade, and by side walls in the form of two rims 9 and 10 that extend between the leading edge 12 and the trailing edge 14 of the blade, one of the two rims 9 extending the pressure side wall 8 of the blade while the other rim extends the suction side wall 11 of the blade. These rims are referred to herein as the pressure rim and the suction rim.

The rubbing surfaces between the free end 3 of each blade and the annular surface of the turbine casing 16 that surrounds the blades, as shown in FIG. 2, are thus restricted to the rims 9 and 10 so as to protect the body of the blade, and more particularly its end wall 7. Furthermore, the rims 9 and 10 serve to optimize the clearance J between the free end of the blade 3 and the casing 16, and thus limit the amount of gas that can pass from the pressure side to the suction side, thereby generating aerodynamic losses that are harmful to the efficiency of the machine.

Because of the high temperatures of the gas passing through the turbine and the high speeds of rotation of the blades, it is necessary to cool the end rims 9 and 10 so as prevent them from deteriorating under the combined effect of friction and heat. Thus, cooling channels are generally provided to connect the internal cooling passage 18 of the hollow blade to the open cavity 5 so as to deliver cool air to the rims 9 and 10.

Furthermore, recent studies have shown that the absence of the pressure rim 9 makes it possible to overcome problems of this rim deteriorating while nevertheless still guaranteeing turbine efficiency that is as good as or even better than the efficiency of a blade having two rims, one on the pressure side and another on the suction side.

However, the absence of a pressure rim 9 makes it necessary to improve the cooling of the suction rim 10, since it is no longer protected from hot gas by the pressure rim 9.

In conventional blades having two rims as described in documents EP 0 816 636 B1 and EP 1 270 873 A2, the channels dedicated to cooling the suction rim cool it poorly, either because they are located too far away from said rim, or because they open out in the vicinity of the top end of the rim. At best, they cool only the top end of the suction rim.

Document EP 1 422 382 A2 presents a solution for improving the cooling of the suction rim of a blade that does not have a pressure rim. That solution consists in making notches in the side wall of the suction rim facing the open cavity and impacted by the hot gases. Said notches extend substantially from the base of the suction rim to the top end of said rim, and cooling channels are pierced at the bottoms of these notches down to the internal cooling passage in the blade. The main drawback of those notches are that they weaken the suction rim, in particular at its top end, and they confine the cool air so that the wall portions that are situated between the notches are cooled not at all (or very poorly). In addition, depending on the shapes of the notches, it can be difficult to drill the cooling channels, and that operation can require specific equipment.

OBJECTS AND SUMMARY OF THE INVENTION

An object of the invention is to provide a hollow blade for a turbomachine that is simple to manufacture and in which the end rim(s) is/are well cooled.

To achieve this object, the invention provides a hollow turbomachine blade including an internal cooling passage, an open cavity situated at the free end of the blade and defined by an end wall and the side wall of at least one rim extending between the leading edge and the trailing edge of the blade, said blade further including at least one cooling channel connecting said internal cooling passage to said open cavity, and said cooling channel opens out in the vicinity of the junction zone between the end wall and the side wall of the rim, i.e. at the base of the rim, and the side wall of the rim forms an obtuse angle, strictly greater than 90°, relative to said end wall.

The advantages of the invention are associated firstly with the inclination of the side wall of the rim relative to the direction that is orthogonal to the end wall, which direction is considered below as being vertical, and secondly with the fact that the cooling channels are formed at the base of the rim.

This disposition allows the cooling air escaping from the channels to run along the wall of the rim and thus form a protective air film on said wall, protecting the rim from the hot gases and cooling it.

In addition, this inclination of the side wall of the rim makes it easier to drill the cooling channels: it is easy to drill these channels even in a vertical direction, since the space over the junction zone between the end wall and the side wall is sufficiently unencumbered to allow a laser beam or a tool (e.g. an electrode) to pass. Conversely, it can be observed that drilling a channel at the base of a rim side wall forming an acute angle or a right angle with the end wall is an operation that is lengthy and difficult since care needs to be taken to avoid damaging the side wall and to avoid piercing the channel too far away from said wall.

In a particular embodiment of the invention, the blade does not have a pressure rim extending the pressure wall, or it includes only a fraction of a pressure rim. Under such circumstances, the end of the blade presents an end rim that extends between the leading edge and the trailing edge of the blade but that is set back from the pressure side: in general this is constituted by the suction rim running along the suction side, but it could also involve an intermediate rim situated between the pressure and suction sides at the end of the blade.

BRIEF DESCRIPTION OF THE DRAWINGS

The invention and its advantages can be better understood on reading the following detailed description of an embodiment of a blade in accordance with the invention. This description is made with reference to the accompanying figures, in which.

MORE DETAILED DESCRIPTION

Figure 1:
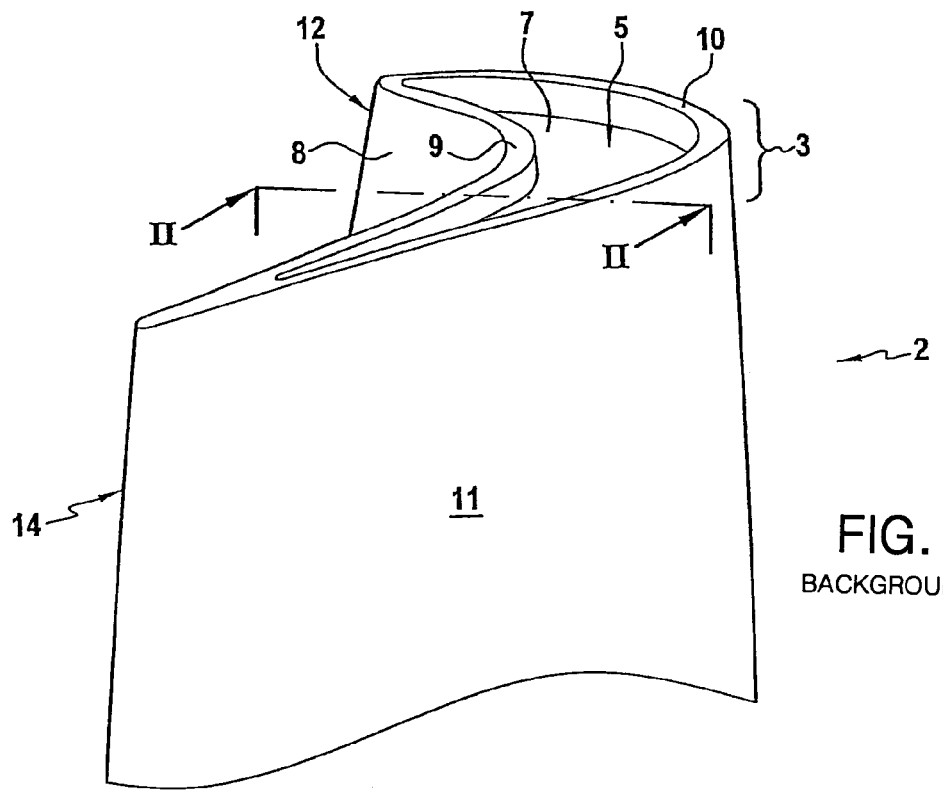
FIG. 1 is a perspective view of the free end of a blade presenting a pressure rim and a suction rim.
Figure 2:
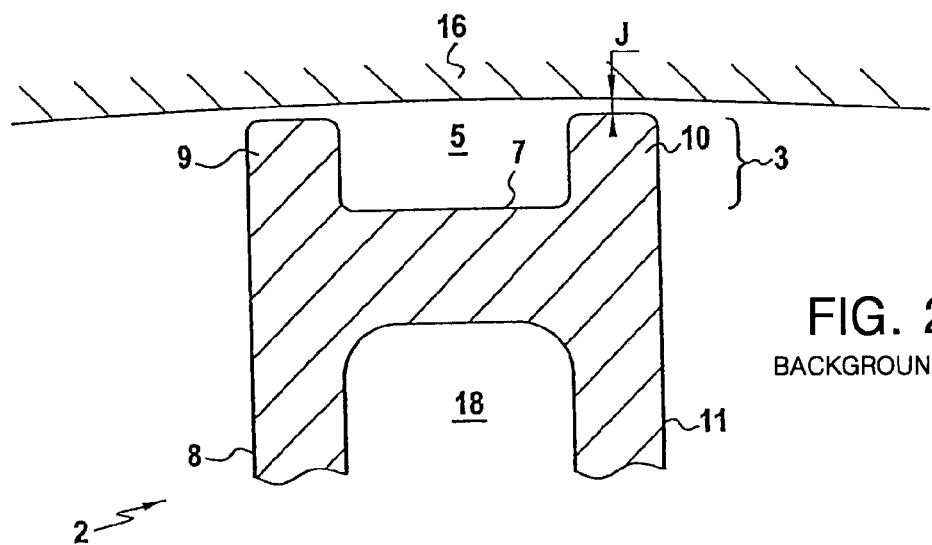
FIG. 2 is a cross-section on plane II-II through the end of the FIG. 1 blade, in a region that does not include a cooling channel.
Figure 3:
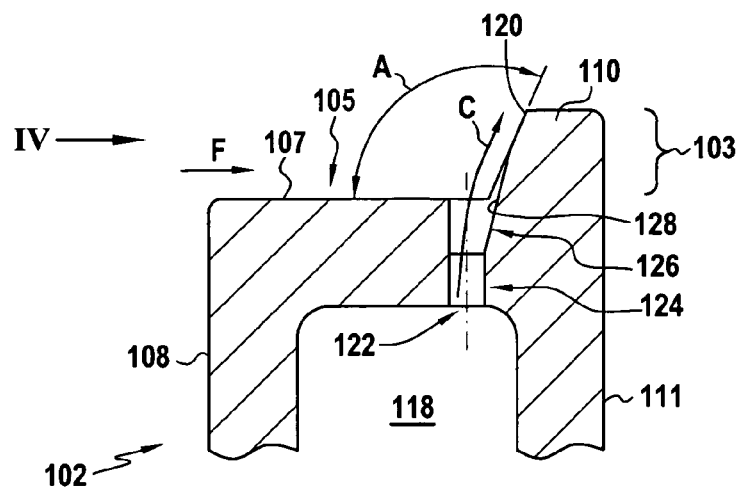
FIG. 3 is a cross-section analogous to that of FIG. 2, through the free end of a blade of the invention, which blade presents a pressure rim but not a suction rim; this section is made through a cooling channel.
Figure 4:
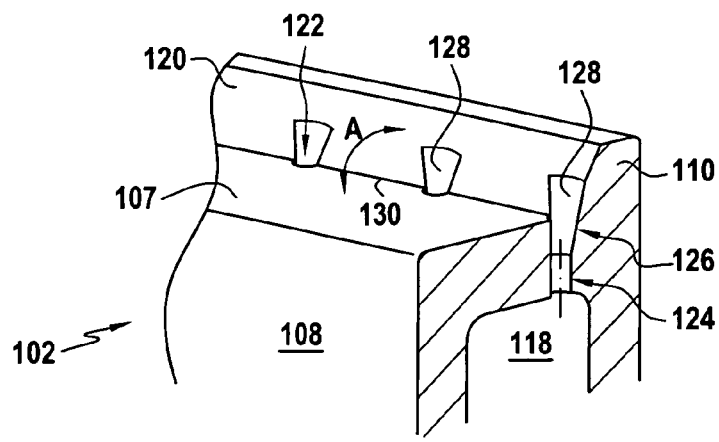
FIG. 4 is a perspective view seen looking along arrow IV in FIG. 3 showing the wall of the suction rim of the blade.

With reference to FIGS. 3 and 4, there follows a description of an embodiment of a blade 102 of the invention. Portions of the blade 102 that are analogous to portions of the blade 2 shown in FIGS. 1 and 2 are given the same reference numbers plus 100.

In the example of FIGS. 3 and 4, the free end 103 of the blade 102 presents a suction rim 110 in the region that is shown, but it does not present a pressure rim.

The side wall 120 of the suction rim co-operates with the end wall 107 to define the open cavity 105. Because there is no pressure rim, the side wall 120 is struck by the hot gas flowing through the turbine and driving the blades 102. Relative to the blade, the hot gas flows in the direction of arrow F. The side wall 120 is thus subjected to very high temperatures and needs to be cooled effectively.

For this purpose, cooling channels 122 connect the internal cooling passage 118 of the blade 102 to the cavity 105 and open out to the base of the rim 110 at the junction zone between said rim and the end wall 107 of the cavity 105. In this example, the side wall 120 and the end wall 107 present plane cross-sections, so there exists a sharp edge 130 in the junction zone between these walls. Nevertheless, this junction zone could be rounded.

The channels 122 comprise two portions: an adjustment portion formed by a drilled hole 124, and by a diffusion portion 126 formed both in line with the hole 124 and by an indentation 128 formed in the wall 120 of the rim at the outlet from the channel 122. The adjustment portion is so called since the minimum section of the drilled hole 124 influences the quantity of cool air flowing through the channel 122.

The diffusion portion 126 opens to the inside of the cavity 105 and communicates with the hole 124. The hole 124 opens out firstly to the inside of the diffusion portion 126 and secondly to the inside of the passage 118.

The hole 124 may be cylindrical in shape and is made, for example, by laser drilling or by electroerosion, at the base of the wall 120. The axis of the hole 124 is drawn in chain-dotted lines and is orthogonal to the end wall 107.

The side wall 120 of the rim 110 forms an angle A relative to the end wall 107 that is obtuse, being strictly greater than 90°, so it does not impede making the vertical hole 124.

The indentation 128 is formed in part in the wall 120 and in part inside the hole 124. This indentation 128 is formed, for example, by electroerosion using an electrode that is centered on the hole 124. The electrode may be conical in shape with a tip that is rounded to a greater or lesser extent. Thus, advantageously, the indentation 128 presents an outline that is generally triangular in shape, and the bottom of this indentation is curved, and more precisely convex relative to the drilling axis 124.

Its triangular outline serves to spread the flow of air leaving the hole 124 and thus enlarge the area of the side wall 120 that is cooled.

The curved shape of the bottom of the indentation 128 serves to avoid forming sharp edges in the rim 110 since that would weaken it. In addition, the indentation 128 comes to an end before the top end of the rim 110 so as to avoid weakening it. Advantageously, the indentation 128 comes to an end before or approximately halfway up the rim 110 so that the cool air streams leaving the fan-shaped indentations 128 spread as widely as possible over the wall 120.

Naturally, the way in which the cooling channels 122 are distributed along the wall 120 is important for ensuring that this wall is properly cooled, and the channels 122 are preferably distributed uniformly and are close enough to one another to form a protective film that is substantially continuous along the wall 120. The angle of inclination A of the wall 120 is also important for ensuring that the cool air stream leaving the channels 122 remains in contact with the wall 120. Thus, the angle A should be small enough to ensure that the cool air stream flowing along arrow C does not move away from the wall 120, but on the contrary remains in contact therewith.

Furthermore, the angle A should be large enough to avoid impeding drilling the channels 122, as explained above. Thus, the angle A formed between the side wall 120 of the rim 110 and the end wall 107 lies in the range 110° to 135°, and advantageously is situated at about 120°.

The above-described example blade is easy to manufacture, firstly because it is easy to make the sloping side wall 120 of the rim 110 by casting, such that no additional machining step is needed. Secondly the cooling channels are made easier to drill by the wall 120 being inclined and they can be made quickly using commonplace drilling techniques. The manufacture of such a blade is thus inexpensive.

Naturally, the invention is not limited to a blade presenting a suction rim only, but could be applied, for example, to a blade presenting a suction rim and a fraction only of a pressure rim, or indeed a blade presenting an intermediate rim that does not extend either the pressure wall or the suction wall, but that is situated at the end of the blade, between said pressure and suction sides. Whatever the rim in question, the invention makes it possible to cool it by forming a film of cool air against its side wall that is exposed to the hot gas.

What is claimed is:

1. A hollow turbomachine blade including an internal cooling passage, an open cavity situated at a free end of the blade and defined by an end wall and a side wall of at least one rim extending between a leading edge and a trailing edge of the blade, and at least one cooling channel connecting said internal cooling passage to said open cavity, wherein said cooling channel opens out at the base of said side wall of the rim, wherein said side wall forms an angle A relative to said end wall that is obtuse, being strictly greater than 90°, wherein an indentation is formed in said side wall at an outlet from said cooling channel, and wherein said indentation comes to an end before the top end of the rim.

2. A hollow blade according to claim 1, wherein the blade of the invention does not have a pressure rim or has only a fraction of a pressure rim.

3. A hollow blade according to claim 1, wherein the angle formed between the side wall and the end wall lies in the range 110° to 135°, and is advantageously situated at about 120°.

4. A hollow blade according to claim 1, wherein the outline of said indentation is generally triangular in shape.

5. A hollow blade according to claim 1, wherein the bottom of said indentation is curved.

6. A hollow blade according to claim 1, wherein said cooling channel is in two portions: an adjustment portion formed by a drilled hole and a diffusion portion formed in part by said indentation.

7. A hollow blade according to claim 1, wherein a plurality of cooling channels are distributed regularly along said side wall.

8. A hollow blade according to claim 1, wherein said indentation comes to an end close to half way up the height of said rim.

* * * * *